US012566298B2

(12) United States Patent
Seabrook et al.

(10) Patent No.: US 12,566,298 B2
(45) Date of Patent: Mar. 3, 2026

(54) CABLE GUIDES FOR SUPPORTING A FIBER OPTIC CABLE WITH A SENSING REGION RELATIVE TO A TUBE, HYDROCARBON CONVEYANCE SYSTEMS INCLUDING THE CABLE GUIDES, AND METHODS OF ACOUSTICALLY PROBING AN ELONGATE REGION WITH A HYDROCARBON CONVEYANCE SYSTEM

(71) Applicant: ExxonMobil Technology and Engineering Company, Spring, TX (US)

(72) Inventors: Brian C. Seabrook, Houston, TX (US); Ted A. Long, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 634 days.

(21) Appl. No.: 17/810,411

(22) Filed: Jul. 1, 2022

(65) Prior Publication Data

US 2023/0010732 A1 Jan. 12, 2023

Related U.S. Application Data

(60) Provisional application No. 63/219,396, filed on Jul. 8, 2021.

(51) Int. Cl.
*G02B 6/36* (2006.01)
*F17D 5/00* (2006.01)
(Continued)

(52) U.S. Cl.
CPC ............. *G02B 6/3616* (2013.01); *F17D 5/00* (2013.01); *G01M 5/0058* (2013.01); *G01M 5/0091* (2013.01); *G02B 6/02076* (2013.01)

(58) Field of Classification Search
CPC ..... G02B 6/3616; G02B 6/02076; F17D 5/00; G01M 5/0091
See application file for complete search history.

(56) References Cited

U.S. PATENT DOCUMENTS 4,946,275 A * 8/1990 Bartholomew ........ G01D 5/268
250/227.21
5,684,297 A * 11/1997 Tardy ................. G01D 5/35383
385/12

(Continued)

*Primary Examiner* — Lina Cordero
*Assistant Examiner* — Lyudmila Zaykova-Feldman
(74) *Attorney, Agent, or Firm* — ExxonMobil Technology and Engineering Company—Law Department

(57) ABSTRACT

Cable guides that support a fiber optic cable relative to a tube, hydrocarbon conveyance systems including the cable guides, and methods of acoustically probing an elongate region. The cable guides include a cable retention structure with a first retention region configured to align a first diffraction grating along a first sensing axis and a second retention region configured to align a second diffraction grating along a second sensing axis that is nonparallel to the first sensing axis. The tube defines a tubular conduit configured to convey a hydrocarbon. The hydrocarbon conveyance systems include a tube, a distributed acoustic sensor, and a cable guide. The methods include transmitting an initiated optical signal and receiving a reflected optical signal that includes reflected portions that are reflected by a first diffraction grating and a second diffraction grating. The methods further include analyzing the reflected optical signal to detect an applied mechanical strain.

16 Claims, 5 Drawing Sheets

(51) Int. Cl.
  G01M 5/00          (2006.01)
  G02B 6/02          (2006.01)

(56)                References Cited

U.S. PATENT DOCUMENTS

|  |  |  |  |  |
|---|---|---|---|---|
| 6,754,416 | B1 * | 6/2004 | Mitchell | G02B 6/02123 |
| 2002/0063866 | A1 * | 5/2002 | Kersey | E21B 47/113 |
|  |  |  |  | 356/478 |
| 2002/0125413 | A1 * | 9/2002 | Saini | G01N 21/774 |
|  |  |  |  | 250/227.14 |
| 2003/0094281 | A1 * | 5/2003 | Tubel | G01V 8/16 |
|  |  |  |  | 166/250.03 |
| 2005/0236161 | A1 * | 10/2005 | Gay | E21B 17/206 |
| 2006/0233485 | A1 * | 10/2006 | Allen | G01M 11/083 |
|  |  |  |  | 385/13 |
| 2011/0243185 | A1 * | 10/2011 | Liu | G01M 5/0091 |
|  |  |  |  | 374/E11.016 |
| 2012/0308174 | A1 * | 12/2012 | Head | E21B 47/08 |
| 2020/0088894 | A1 * | 3/2020 | LeBlanc | E21B 47/07 |
| 2021/0131276 | A1 * | 5/2021 | LeBlanc | E21B 19/22 |
| 2021/0199826 | A1 * | 7/2021 | Mukhtarov | G01V 1/226 |
| 2022/0049587 | A1 * | 2/2022 | Park | E21B 43/119 |

* cited by examiner

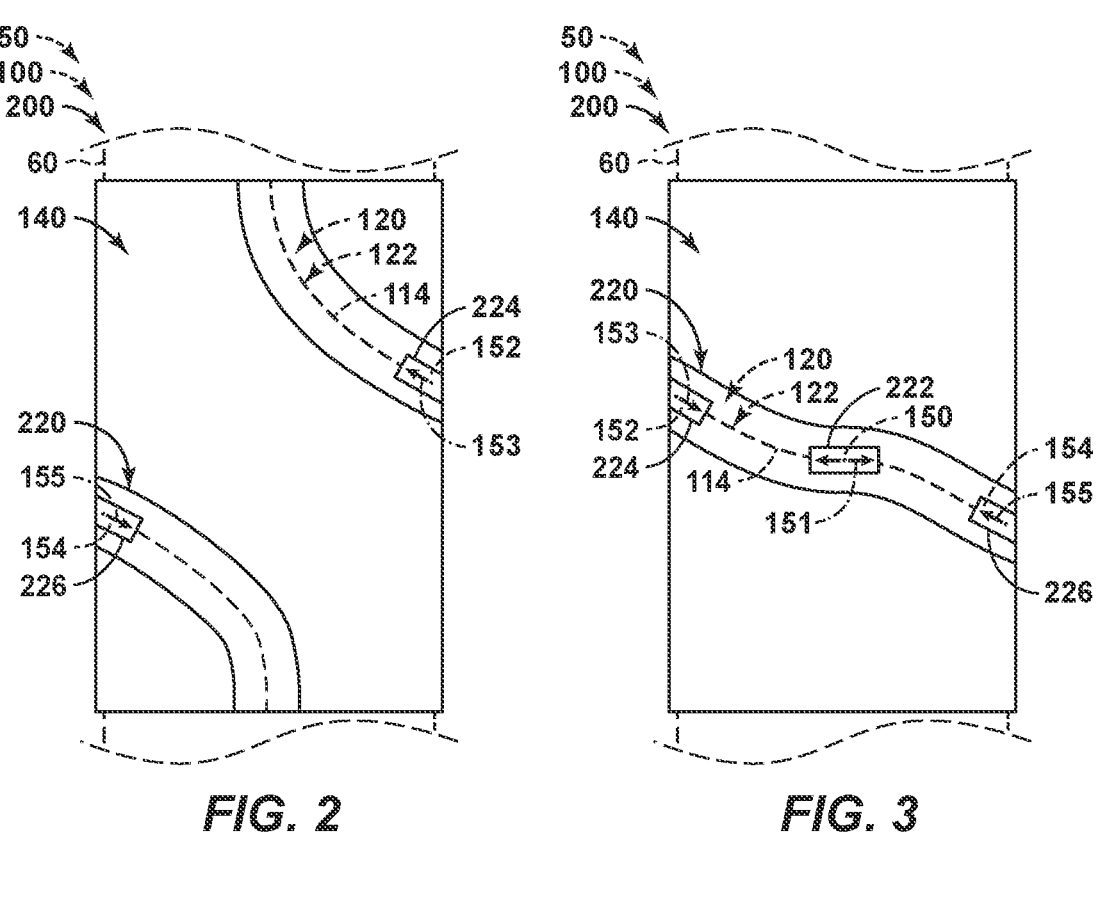
*FIG. 2*          *FIG. 3*
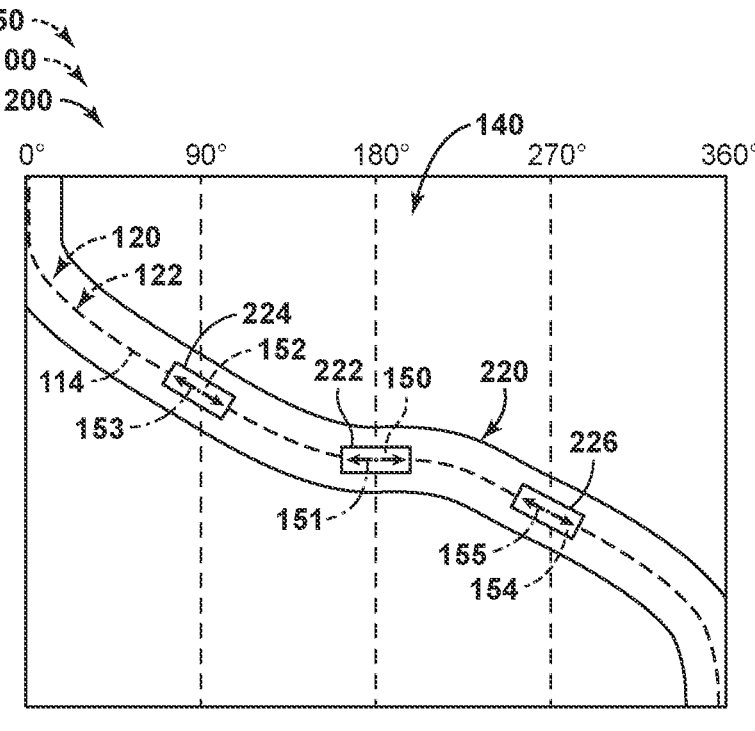
*FIG. 4*

CABLE GUIDES FOR SUPPORTING A FIBER OPTIC CABLE WITH A SENSING REGION RELATIVE TO A TUBE, HYDROCARBON CONVEYANCE SYSTEMS INCLUDING THE CABLE GUIDES, AND METHODS OF ACOUSTICALLY PROBING AN ELONGATE REGION WITH A HYDROCARBON CONVEYANCE SYSTEM

CROSS-REFERENCE TO RELATED APPLICATIONS

This application claims the benefit of U.S. Provisional Application Ser. No. 63/219,396, filed Jul. 8, 2021, the disclosure of which is hereby incorporated by reference in its entirety.

FIELD OF THE INVENTION

The present disclosure relates generally to cable guides that support a fiber optic cable with a sensing region relative to a tube, to hydrocarbon conveyance systems including the cable guides, and to methods of acoustically probing an elongate region with a hydrocarbon conveyance system including a tube and a distributed acoustic sensor.

BACKGROUND OF THE INVENTION

Distributed optical fiber sensing has been utilized to detect changes in temperature and/or strain along the length of an optical fiber. When utilized to detect changes in strain, distributed optical fiber sensing also may be referred to herein as distributed acoustic sensing (DAS). Such techniques may utilize a laser pulse, which propagates along the length of the optical fiber and is reflected at a variety of distributed sensing locations, to monitor changes in temperature and/or strain along the length of the optical fiber. More specifically, these techniques may monitor the reflected laser light and/or may utilize information contained in the reflected laser light in order to detect a strain in the optical fiber along a length of the optical fiber.

Distributed optical fiber techniques may be effective at providing qualitative and/or quantitative information regarding various environmental conditions, such as acoustic vibration, in an environment that surrounds the optical fiber. However, when the fiber optic cable extends along a single and/or continuous direction, it may be difficult to obtain directional information regarding these environmental conditions, or to detect such conditions robustly when an incident acoustic vibration propagates along a direction that is misaligned with the fiber optic cable. In addition, the obtained information generally is not location-specific and instead is an average of conditions experienced by a relatively long segment, or region, of the optical fiber. Thus, there exists a need for improved methods of acoustically and optically probing an elongate region and/or for hydrocarbon conveyance systems that utilize the methods.

SUMMARY OF THE INVENTION

Cable guides that support a fiber optic cable with a sensing region, which includes a first diffraction grating and a second diffraction grating, relative to a tube, hydrocarbon conveyance systems including the cable guides, and methods of acoustically probing an elongate region with a hydrocarbon conveyance system including a tube and a distributed acoustic sensor. The cable guides include a cable retention structure configured to support the fiber optic cable. The cable retention structure includes a first retention region, which is configured to align the first diffraction grating along a first sensing axis, and a second retention region, which is configured to align the second diffraction grating along a second sensing axis. The first sensing axis and the second sensing axis are nonparallel to one another. The tube defines a tubular conduit configured to convey a hydrocarbon.

The hydrocarbon conveyance systems include a tube and a distributed acoustic sensor. The tube defines a tubular conduit configured to convey a hydrocarbon. The distributed acoustic sensor includes a fiber optic cable extending along, and in acoustic communication with, the tube. The fiber optic cable includes a sensing region that includes a first diffraction grating aligned with a first sensing axis and a second diffraction grating aligned with a second sensing axis. The hydrocarbon conveyance system further includes a cable guide that operatively couples the fiber optic cable to the tube such that the first sensing axis and the second sensing axis are nonparallel to one another.

The methods include transmitting an initiated optical signal along a fiber optic cable and receiving a reflected optical signal from the fiber optic cable. The reflected optical signal includes reflected portions of the initiated optical signal that are reflected by a first diffraction grating aligned with a first sensing axis and a second diffraction grating aligned with a second sensing axis that is nonparallel to the first sensing axis. The methods further include analyzing the reflected optical signal to detect an applied mechanical strain.

BRIEF DESCRIPTION OF THE DRAWINGS

FIG. 2 is a schematic front view illustrating an example of a cable guide according to the present disclosure.

FIG. 3 is a schematic rear view illustrating the cable guide of FIG. 2.

FIG. 4 is a schematic cylindrical projection illustrating the cable guide of FIGS. 2-3.

DETAILED DESCRIPTION OF THE INVENTION

Figure 1:
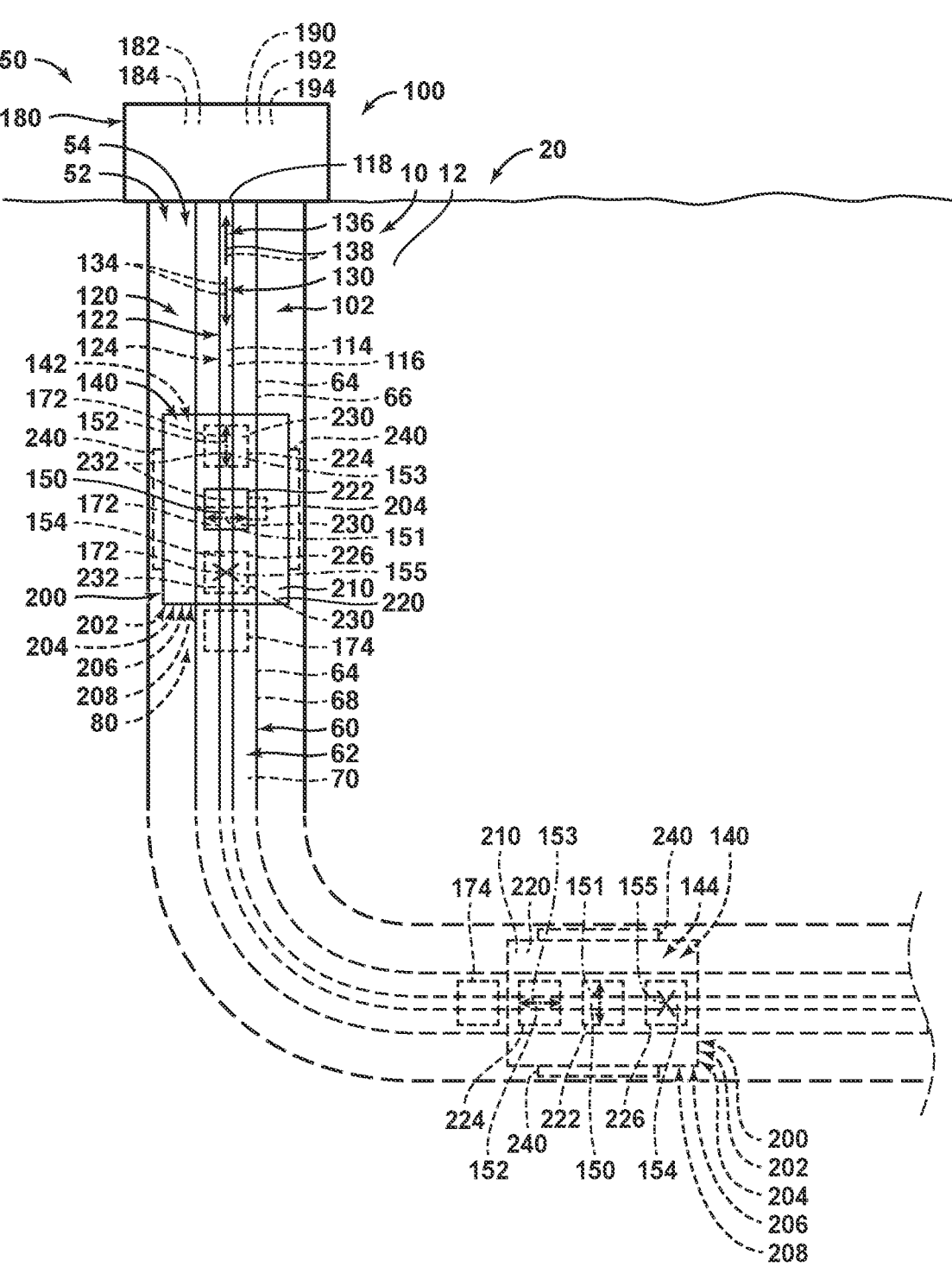
FIG. 1 is a schematic illustration of examples of a hydrocarbon conveyance system including a cable guide according to the present disclosure.

FIGS. 1-9 collectively provide examples of hydrocarbon conveyance systems 100, of cable guides 200, of methods 300, and of data and/or analyses that may be obtained from and/or utilized with methods 300, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

FIG. 1 is a schematic illustration of examples of a hydrocarbon conveyance system 100 including examples of a cable guide 200 and that may be utilized in conjunction with, and/or as a component of, hydrocarbon wells 50, according to the present disclosure. In some examples, and as schematically illustrated in FIG. 1, hydrocarbon well 50 includes a wellbore 52 that extends within a subsurface region 10. Wellbore 52 also may be referred to herein as extending between a surface region 20 and subsurface region 10.

As schematically illustrated in FIG. 1, hydrocarbon conveyance system 100 includes a tube 60, a distributed acoustic sensor 120, and a cable guide 200. Tube 60 also may be referred to herein as a tubular 60, as a fluid tubular 60, and/or as a downhole tubular 60. Tube 60 defines a tubular conduit 62. As schematically illustrated in FIG. 1, tube 60 and/or tubular conduit 62 that is defined thereby may be configured to convey a conduit fluid 70 within an elongate region 54 and/or may extend within elongate region 54. In particular, tubular conduit 62 may be at least substantially filled with conduit fluid 70. As discussed in more detail herein, elongate region 54 may include and/or be a hydrocarbon pipeline 102 or hydrocarbon well 50. In such examples, hydrocarbon conveyance system 100 may be described as forming a portion of hydrocarbon pipeline 102 and/or of hydrocarbon well 50, respectively. Correspondingly, conduit fluid 70 may be referred to herein as, and/or may be, a hydrocarbon 70. Distributed acoustic sensor 120 extends within elongate region 54 and is in acoustic communication with tube 60. Distributed acoustic sensor 120 may define a plurality of sensing regions 140 that are spaced apart along a length of the distributed acoustic sensor and/or along a length of tube 60.

Tube 60 may include any suitable structure that may define tubular conduit 62, that may convey conduit fluid 70, and/or that may extend within wellbore 52 and/or within elongate region 54. When hydrocarbon conveyance system 100 includes and/or forms a portion of hydrocarbon pipeline 102, tube 60 may at least partially define the hydrocarbon pipeline and also may be referred to herein as a pipe 60. Additionally or alternatively, and when hydrocarbon conveyance system 100 includes and/or forms a portion of hydrocarbon well 50, tube 60 may include and/or may at least partially define a casing string of the hydrocarbon well, a production tubing of the hydrocarbon well, a completion element of the hydrocarbon well, a liner of the hydrocarbon well, and/or a screen of the hydrocarbon well.

In some examples, and as schematically illustrated in FIG. 1, hydrocarbon conveyance system 100 optionally includes a controller 180 programmed to utilize distributed acoustic sensor 120 to monitor an acoustic excitation of tube 60, as described in more detail herein. Controller 180 may be adapted, configured, designed, constructed, and/or programmed to probe elongate region 54, such as via and/or utilizing distributed acoustic sensor 120 as described herein. As an example, controller 180 may operate to probe elongate region 54 by performing methods 300, which are discussed in more detail herein.

As schematically illustrated in FIG. 1, distributed acoustic sensor 120 includes a fiber optic cable 122 extending along, and in acoustic communication with, tube 60. Fiber optic cable 122 includes sensing region 140, which includes a diffraction grating 150 that is aligned with a sensing axis 151. In particular, and as described in more detail herein, cable guide 200 operatively couples fiber optic cable 122 to tube 60 such that diffraction grating 150 is aligned with sensing axis 151.

In some examples of hydrocarbon well 50, fiber optic cable 122 may be rigidly and/or operatively attached to wellbore 52 and/or to tube 60. In particular, in some examples, and with reference to FIG. 1, fiber optic cable 122 and/or tube 60 is mechanically and/or rigidly coupled to a subsurface formation 12 within subsurface region 10 such that an acoustic excitation that propagates through subsurface region 10 and/or through subsurface formation 12 yields a corresponding acoustic excitation within and/or along fiber optic cable 122 and/or tube 60. As an example, and as schematically illustrated in FIG. 1, hydrocarbon conveyance system 100 may include cement 80, which also may be referred to herein as hardened cement 80, that is positioned to extend between wellbore 52 and tube 60, and fiber optic cable 122 may extend within the cement. In such examples, distributed acoustic sensor 120 and/or fiber optic cable 122 may be mechanically coupled to tube 60 and/or to wellbore 52 at least partially via cement 80. As described in more detail herein, distributed acoustic sensor 120 and/or fiber optic cable 122 may be attached or otherwise secured, tethered, or coupled to an internal and/or to an external surface of tube 60 at a plurality of locations, or even continuously, along the length of the fiber optic cable. The presence of the attachment between the fiber optic cable and wellbore 52 and/or tube 60 may create a strong physical attachment and/or coupling between the fiber optic cable and strata that extends within subsurface region 10, thereby increasing a sensitivity of distributed acoustic sensor 120 to sense acoustic excitations.

As described in more detail herein, distributed acoustic sensor 120 is configured to sense, or to indicate the presence of, an acoustic excitation and/or vibration that operates to apply a mechanical strain to diffraction grating 150. In particular, distributed acoustic sensor 120 may be configured such that a mechanical strain that is applied to diffraction grating 150 along, or at least partially along, a direction parallel to sensing axis 151 results in a shift in a property (e.g., a wavelength) of light that is reflected by diffraction grating 150. Accordingly, a measurement of the reflected light may serve as a quantitative and/or qualitative indication of the presence and/or magnitude of the acoustic excitation, provided that the acoustic excitation propagates along a direction at least partially parallel to sensing axis 151.

In some examples, distributed acoustic sensor 120 may be configured such that sensing axis 151 is tilted and/or angled relative to a length of tube 60. In particular, some prior art examples may perform distributed acoustic sensing that utilizes a diffraction grating that extends along a sensing axis that is aligned with a length of the tube to which the diffraction grating is coupled. However, in such prior art examples, such a diffraction grating may be sensitive only to acoustic excitations that propagate along a direction parallel to the length of the tube. By contrast, and as schematically illustrated in FIG. 1, orienting sensing axis 151 of diffraction grating 150 according to the present disclosure along a freely selected direction, such as a direction that is not parallel to the length of tube 60, may enable the detection of acoustic excitations that propagate along a direction that is not parallel to the length of the tube.

In some examples, a measurement resolution of distributed acoustic sensor 120 may be enhanced by aligning multiple diffraction gratings 150 along respective sensing axes 151 at a given (e.g., a particular) sensing location and/or region. For example, and as schematically illustrated in FIG. 1, diffraction grating 150 may be a first diffraction grating 150, sensing axis 151 may be a first sensing axis 151, and sensing region 140 additionally may include a second diffraction grating 152 aligned with a second sensing axis 153 that is nonparallel to first sensing axis 151. In such examples, distributed acoustic sensor 120 may be configured to sense an acoustic excitation that propagates along any direction with a vector component that is within a plane that is defined and/or spanned by first sensing axis 151 and second sensing axis 153. Moreover, in such examples, distributed acoustic sensor 120 may be configured to determine (e.g., sense, detect, estimate, and/or calculate) the direction along which the acoustic excitation propagates, at least relative to and/or as projected onto the plane defined by first sensing axis 151 and second sensing axis 153. In such examples, distributed acoustic sensor 120 may be described as enabling a two-dimensional detection of acoustic excitations that are incident at sensing region 140. Such configurations thus may offer benefits over examples in which sensing region 140 includes only a single diffraction grating 150 oriented along a single respective sensing axis 151.

In some examples, and as schematically illustrated in FIG. 1 and described in more detail herein, sensing region 140 further includes a third diffraction grating 154 aligned with a third sensing axis 155 that is nonparallel to each of first sensing axis 151 and second sensing axis 153. Accordingly, in such examples, such a configuration may enable the detection and/or characterization of an acoustic excitation that propagates along any direction relative to sensing region 140. In particular, in such examples, distributed acoustic sensor 120 may be configured to determine (e.g., sense, detect, estimate, and/or calculate) the magnitude of the acoustic excitation and/or the three-dimensional direction along which the acoustic excitation propagates. In such examples, distributed acoustic sensor 120 may be described as enabling a three-dimensional detection of acoustic excitations that are incident at distributing sensing region 140.

As used herein, references to diffraction grating 150 that do not further specify a particular diffraction grating (such as first diffraction grating 150) may be understood to refer to any or all of first diffraction grating 150, second diffraction grating 152, third diffraction grating 154, and/or any other diffraction grating of sensing region 140. Similarly, as used herein, references to sensing axis 151 that do not further specify a particular sensing axis (such as first sensing axis 151) may be understood to refer to any or all of first sensing axis 151, second sensing axis 153, third sensing axis 155, and/or the respective sensing axis of any other diffraction grating of sensing region 140.

While the more specific examples of cable guide 200 and/or of hydrocarbon conveyance system 100, which are disclosed herein, generally relate to examples in which each sensing region 140 of distributed acoustic sensor 120 includes three diffraction gratings 150, this is not required of all examples of distributed acoustic sensor 120. In particular, it is to be understood that examples in which each sensing region 140 includes one diffraction grating 150, two diffraction gratings, three diffraction gratings, or more than three diffraction gratings all are within the scope of the present disclosure.

For example, configuring sensing region 140 to include more than three diffraction gratings 150 may serve to augment a measurement resolution with which the acoustic excitation may be characterized. However, increasing the number of diffraction gratings 150 that are included at each, or at a given (e.g., a particular), sensing region 140 also may reduce a total optical bandwidth that is available to be utilized by other sensing regions 140 of distributed acoustic sensor 120. Accordingly, the number (e.g., quantity) of diffraction gratings 150 that are present at each sensing region 140 may be selected, calibrated, and/or optimized to meet the specific needs and/or constraints of a particular installation of hydrocarbon conveyance system 100 and/or for particular region(s) within the hydrocarbon conveyance system.

In the present disclosure, sensing region 140 generally refers to a localized region within which each corresponding diffraction grating 150 (e.g., first diffraction grating 150, second diffraction grating 152, and/or third diffraction grating 154) is positioned and/or located. As more specific examples, each sensing region 140 may be configured such that a maximum distance separating each diffraction grating 150 of the sensing region is at most 5 meters (m), at most 2 m, at most 1 m, at most 0.5 m, at most 0.2 m, at most 0.1 m, at most 0.05 m, at most 0.02 m, at most 0.01 m, and/or at least 0.005 m. In this manner, sensing regions 140 according to the present disclosure may be described as standing in contrast with prior art distributed acoustic sensing systems that include a plurality of diffraction gratings that are separated by tens or hundreds of meters.

Hydrocarbon conveyance system 100 additionally includes one or more structures that are configured to align each diffraction grating 150 of each sensing region 140 with the respective sensing axis 151. In particular, and as schematically illustrated in FIG. 1, hydrocarbon conveyance system 100 additionally includes a cable guide 200 that operatively couples fiber optic cable 122 to tube 60 and/or directs fiber optic cable 122 such that first sensing axis 151 and second sensing axis 153 are nonparallel to one another. In examples in which sensing region 140 further includes third diffraction grating 154, cable guide 200 further operatively couples fiber optic cable 122 to tube 60 and/or directs fiber optic cable 122 such that third sensing axis 155 is nonparallel to each of first sensing axis 151 and second sensing axis 153.

In this manner, cable guide 200 (e.g., a particular cable guide 200) may be described as supporting and/or defining at least one respective sensing region 140 of distributed acoustic sensor 120. In particular, in some examples, and as schematically illustrated in FIG. 1, hydrocarbon conveyance system 100 may include a plurality of cable guides 200, and distributed acoustic sensor 120 may include a plurality of sensing regions 140 that are distributed along a length of tube 60, each of which may be supported by a respective cable guide 200 of the plurality of cable guides. In such examples, each sensing region 140 may include a respective first diffraction grating 150, a respective second diffraction grating 152, a respective third diffraction grating 154, etc. In such examples, fiber optic cable 122 may optically interconnect each of the plurality of sensing regions 140.

In examples in which distributed acoustic sensor 120 includes a plurality of distributed sensing regions 140, the distributed sensing regions may be separated by any suitable distance. As examples, distributed acoustic sensor 120 may be configured such that each pair of adjacent sensing regions 140 of the plurality of sensing regions are spaced apart from one another along a length of tube 60 by a separation distance that is at least 0.05 m, at least 0.1 m, at least 0.5 m, at least 1 m, at least 3 m, at least 5 m, at least 10 m, at least 50 m, at least 100 m, at least 500 m, at most 1 kilometer (km), at most 200 m, at most 70 m, at most 20 m, at most 7 m, at most 4 m, at most 2 m, at most 0.7 m, at most 0.2 m, and/or at most 0.07 m.

Additionally or alternatively, in some examples, the separation distance between adjacent distributed sensing regions 140 may correspond to a separation distance between adjacent cable guides 200 of the plurality of cable guides. In particular, in some examples, and as schematically illustrated in FIG. 1, tube 60 may include a plurality of tube segments 64 that are fluidly coupled to one another, such as to collectively define tubular conduit 62, and each cable guide 200 may be operatively coupled to and/or otherwise associated with a respective subset of the plurality of tube segments. More specifically, in some examples, cable guide 200 may be operatively coupled to and/or defined by a single respective tube segment 64 of the plurality of tube segments. In other examples, cable guide 200 may be operatively coupled to and/or defined at and/or by a junction between each of a pair of adjacent tube segments 64 of the plurality of tube segments.

Accordingly, in the present disclosure, references to first diffraction grating 150, second diffraction grating 152, third diffraction grating 154, and/or any features and/or structures thereof generally pertain to a set and/or collection of diffraction gratings that are located at a particular sensing region 140 and/or that are supported by a particular cable guide 200. Similarly, references herein to components, structures, and/or features of a particular cable guide 200 generally pertain to components, structures, and/or features that are utilized in conjunction with a particular respective sensing region 140. However, this is not required of all examples of cable guide 200, and it additionally is within the scope of the present disclosure that a particular cable guide 200 may define and/or support a plurality of sensing regions 140 of distributed acoustic sensor 120.

Figure 5:
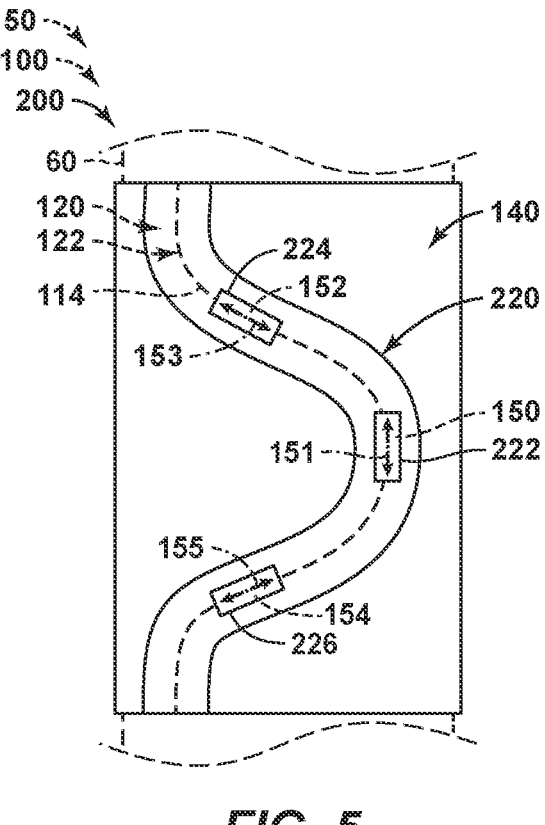
FIG. 5 is a schematic front view illustrating an example of a cable guide according to the present disclosure.

Cable guide 200 may include and/or be any of a variety of structures for operatively coupling fiber optic cable 122 to tube 60 as described herein. FIG. 1 schematically illustrates examples of cable guide 200 as installed within hydrocarbon conveyance system 100 to operatively couple fiber optic cable 122 to tube 60, while FIGS. 2-5 schematically illustrate more specific examples of cable guide 200. In particular, FIGS. 2-3 are schematic front and rear views, respectively, of a first example of cable guide 200, while FIG. 4 schematically represents a cylindrical projection of the example cable guide of FIGS. 2-3. FIG. 5 schematically illustrates another example of cable guide 200.

As schematically illustrated in FIGS. 1-5, cable guide 200 includes a cable retention structure 220 configured to support fiber optic cable 122, such as to align each diffraction grating 150 with the respective sensing axis 151 as described herein. Specifically, cable retention structure 220 includes a first retention region 222 and a second retention region 224. First retention region 222 is configured to align first diffraction grating 150 along first sensing axis 151, while second retention region 224 is configured to align second diffraction grating 152 along second sensing axis 153. In particular, in some examples, first diffraction grating 150 is positioned and/or received within first retention region 222, and second diffraction grating 152 is positioned and/or received within second retention region 224. In an example in which distributed sensing region 140 includes third diffraction grating 154, cable retention structure 220 further may include a third retention region 226 configured to align the third diffraction grating along third sensing axis 155. In particular, in some such examples, third diffraction grating 154 is positioned and/or received within third retention region 226.

In various examples, cable retention structure 220 may support fiber optic cable 122 such that first sensing axis 151, second sensing axis 153, and (when present) third sensing axis 155 are mutually nonparallel to one another. As a more specific example, cable retention structure 220 may support fiber optic cable 122 such that first sensing axis 151, second sensing axis 153, and (when present) third sensing axis 155 are mutually orthogonal to one another. As another example, cable retention structure 220 may support fiber optic cable 122 such that first sensing axis 151, second sensing axis 153, and (when present) third sensing axis 155 are mutually skew to one another. In some examples, cable retention structure 220 is configured to support and/or engage fiber optic cable 122 such that the cable retention structure (and/or first retention region 222, second retention region 224, and/or third retention region 226 thereof) at least partially defines first sensing axis 151, second sensing axis 153, and/or third sensing axis 155.

Cable retention structure 220, first retention region 222, second retention region 224, and/or third retention region 226 each may include and/or be any of a variety of structures for engaging fiber optic cable 122 as described herein. As examples, cable retention structure 220 may include and/or be a channel, a groove, and/or a conduit that is configured to receive and/or engage fiber optic cable 122. Additionally, cable guide 200 may be configured such that cable retention structure 220 is oriented relative to tube 60 in any of a variety of manners during operative use of cable guide 200. For example, FIGS. 2-4 schematically illustrate an example in which cable retention structure 220 extends fully circumferentially around tube 60 during operative use of cable guide 100. Additionally or alternatively, and as also schematically illustrated in FIGS. 2-4, cable guide 200 may be configured such that cable retention structure 220 extends along a helical path around tube 60 during operative use of the cable guide.

As perhaps best seen in the cylindrical projection view of FIG. 4, FIGS. 2-4 schematically illustrate an example in which second retention region 224 and third retention region 226 are positioned at a common side-view angular orientation relative to tube 60 (schematically illustrated in FIGS. 2-3) during operative use of cable guide 200. That is, in this example, each of second retention region 224 and third retention region 226 is oriented such that second sensing axis 153 and third sensing axis 155 are angled relative to tube 60 (e.g., relative to a longitudinal axis of the tube) by the same angle, as viewed along a direction perpendicular to the tube. That is, in this example, although second sensing axis 153 and third sensing axis 155 are not parallel to one another, each of second sensing axis 153 and third sensing axis 155 is oriented relative to tube 60 such that each of second sensing axis 153 and third sensing axis 155 forms the same (or at least substantially the same) angle relative to a longitudinal axis of the tube, as measured in a plane that is tangent to the tube at the respective sensing axis. In this manner, in this example, each of second sensing axis 153 and third sensing axis 155 may be described as having a common inclination relative to tube 60 (e.g., relative to the longitudinal axis of the tube). However, this is not required of all examples of cable retention structure 220. For example, it additionally is within the scope of the present disclosure that cable retention structure 220 may be configured such that each of first retention region 222, second retention region 224, and third retention region 226 is positioned at a distinct side-view angular orientation relative to tube 60 (e.g., as viewed along a direction perpendicular to the tube at the respective retention structure) during operative use of cable guide 200.

FIGS. 2-4 schematically illustrate an example in which cable retention structure 220 extends fully circumferentially around tube 60 to form one full revolution and/or wrapping around the circumference of the tube. In other examples, cable retention structure 220 may extend fully circumferentially around tube 60 to make a plurality of revolutions and/or wrappings around the circumference of the tube. In some such examples, cable retention structure 220 may include a plurality of retention regions such that two or more such retention regions (e.g., two or more of first retention region 222, second retention region 224, and third retention region 226) are configured to align respective diffraction gratings along respective sensing axes that are mutually nonparallel to one another and such that another two or more such retention regions are configured to align respective diffraction gratings along respective sensing axes that are parallel to one another. Such a configuration may serve to enhance a sensing resolution afforded by the distributed sensing region 140 corresponding to such a cable retention structure 220, such as by increasing the number of measurements corresponding to a particular sensing axis (or to a particular direction that is parallel to each of a plurality of sensing axes). However, such a configuration also may reduce a total optical bandwidth that is available to be utilized by the remainder of the sensing regions 140 of distributed acoustic sensor 120.

In other examples, and as schematically illustrated in FIG. 5, cable guide 200 may be configured such that cable retention structure 220 extends only partially circumferentially around tube 60 during operative use of the cable guide. In particular, FIG. 5 schematically illustrates an example in which cable retention structure 220 follows a generally C-shaped path that extends around a portion of a circumference of tube 60 but that does not extend fully circumferentially around tube 60. Similar to the examples discussed above, while FIG. 5 schematically illustrates an example in which cable retention structure 220 follows a single C-shaped path around a portion of a circumference of tube 60, it also is within the scope of the present disclosure that cable retention structure 220 may follow a plurality of such C-shaped paths within a single sensing region 140, such as to form a generally W-shaped path. As discussed above, such a configuration may offer measurement resolution benefits over examples that feature only a single iteration of a C-shaped path, with the offsetting consideration of the total optical bandwidth that is available to be utilized by the remainder of the sensing regions 140 of distributed acoustic sensor 120 presenting a tradeoff that may be optimized for a specific implementation.

As used herein, the terms "in operative use," "during operative use," and the like generally are used to refer to a configuration and/or circumstance in which cable guide 200 is operatively installed upon tube 60 and in which cable guide 200 supports fiber optic cable 122 relative to the tube as described herein. In this manner, references herein to a configuration and/or feature of cable guide 200 as described with reference to tube 60 and/or to fiber optic cable 122 are presented to contextualize and/or to clarify a configuration and/or feature that is present at least when the cable guide is operatively coupled to the tube and/or to the fiber optic cable. However, such descriptions are not limiting, and it is to be understood that cable guide 200 and/or any features and/or descriptions thereof still fall within the scope of the present disclosure even when the cable guide is not in operative use, and/or the cable guide does not operatively engage when tube 60 and/or fiber optic cable 122.

In some examples, cable guide 200 and/or cable retention structure 220 may include one or more features for facilitating installation of fiber optic cable 122 within cable retention structure 220. As an example, and as schematically illustrated in FIG. 1, cable guide 200 and/or cable retention structure 220 may include one or more sensing region visual indicators 230, each of which is configured to provide a visual indication of a location and/or an orientation of first retention region 222, of first sensing axis 151, of second retention region 224, of second sensing axis 153, of third retention region 226, and/or of third sensing axis 155. In such examples, each sensing region visual indicator 230 may be configured to provide a user with a visual indication of the location and/or orientation of each retention region, such as to facilitate proper positioning of fiber optic cable 122 relative to cable guide 200. In particular, each diffraction grating (e.g., first diffraction grating 150, second diffraction grating 152, and/or third diffraction grating 154) may be included in and/or formed on fiber optic cable 122 such that operatively installing the fiber optic cable within cable retention structure 220 includes positioning each diffraction grating within the respective retention region of first retention region 222, second retention region 224, and/or third retention region 226. Accordingly, in such examples, the presence of sensing region visual indicator(s) 230 may facilitate positioning fiber optic cable 122 relative to cable guide 200 and/or cable retention structure 220 such that each diffraction grating is properly positioned relative to the respective retention region of the cable retention structure.

Additionally or alternatively, in some examples, and as further schematically illustrated in FIG. 1, fiber optic cable 122 may include one or more fiber optic cable visual indicators 232, each of which is configured to provide a visual indication of a location of a corresponding diffraction grating 150, such as of first diffraction grating 150, of second diffraction grating 152, and/or of third diffraction grating 154. In this manner, fiber optic cable visual indicators 232 may provide information regarding the location of each diffraction grating 150 and/or of a region of fiber optic cable 122 that includes each diffraction grating. Accordingly, in an example in which cable guide 200 and/or cable retention structure 220 includes the one or more sensing region visual indicators 230, the one or more fiber optic cable visual indicators 232 further may facilitate the alignment and/or positioning of each diffraction grating 150 within the corresponding retention region. More specifically, in some examples, the assembly and/or preparation of distributed acoustic sensor 120 for operative use may include positioning fiber optic cable 122 relative to cable guide 200 and/or cable retention structure 220 such that each fiber optic cable visual indicator 232 is aligned with and/or positioned proximate to a corresponding sensing region visual indicator 230.

When present, each sensing region visual indicator 230 and/or each fiber optic cable visual indicator 232 may include and/or be any of a variety of indicators. As examples, each sensing region visual indicator 230 and/or each fiber optic cable visual indicator 232 may include and/or be a color-coded indicator, a textual indicator, and/or a numerical indicator. Additionally or alternatively, each sensing region visual indicator 230 may include and/or be an indication of a physical orientation of one or more of first retention region 222, of second retention region 224, and/or of third retention region 226 relative to one or more others of the first retention region, the second retention region, and the third retention region. Additionally or alternatively, each fiber optic cable visual indicator 232 may include and/or be an indication of a physical orientation (e.g., an intended and/or preferred physical orientation) of one or more of first sensing axis 151, second sensing axis 153, and/or third sensing axis 155, such as relative to one or more others of the first sensing axis, the second sensing axis, and the third sensing axis, and/or relative to tube 60.

Cable guide 200 may include and/or be any of a variety of structures that may be operatively coupled to tube 60 and/or that may be at least partially defined by the tube. For example, and as schematically illustrated in FIG. 1, cable guide 200 may include and/or be a tube clamp 202, such as may include a clamping structure 210 that is configured to selectively grip tube 60 to retain the cable guide at a fixed clamp location relative to the tube. In some such examples, and in an example in which tube 60 includes a plurality of tube segments 64, tube clamp 202 may be configured to at least partially operatively couple a pair of adjacent tube segments to one another. In particular, and as schematically illustrated in FIG. 1, the plurality of tube segments 64 may include a first tube segment 66 and a second tube segment 68 that are adjacent to one another such that tube clamp 202 is configured to engage each of the first tube segment and the second tube segment to at least partially operatively couple the first tube segment and the second tube segment to one another. Additionally or alternatively, and as further schematically illustrated in FIG. 1, tube 60 may include a tube coupling 204 that at least partially couples first tube segment 66 and second tube segment 68 to one another, and cable guide 200 may include and/or be tube coupling 204.

Additionally or alternatively, in some examples, and as schematically illustrated in FIG. 1, cable guide 200 may include and/or be a tube mandrel 206. In particular, in some such examples, and as schematically illustrated in FIG. 1, tube 60 extends within elongate region 54 defined by wellbore 52, and tube mandrel 206 is configured to engage each of the tube and the wellbore to mechanically couple the tube to the wellbore during operative use of the cable guide. In this manner, tube mandrel 206 may operate to enhance the robustness and/or rigidity of the coupling between tube 60 and wellbore 52 and/or between tube 60 and subsurface formation 12, such as to enhance and/or increase a sensitivity of distributed acoustic sensor 120 to acoustic excitations within the subsurface formation. In some examples, tube mandrel 206 also may be referred to as a pup joint 206.

Additionally or alternatively, in some examples, and as schematically illustrated in FIG. 1, cable guide 200 may include and/or be a tube positioner 208. When present, tube positioner 208 may be any of a variety of structures for positioning tube 60 relative to wellbore 52 and/or relative to elongate region 54, such as by engaging the tube and/or the wellbore. In particular, in some such examples, and as schematically illustrated in FIG. 1, tube positioner 208 includes one or more positioner extensions 240 extending radially away from the tube. In some such examples, positioner extension(s) 240 are configured to engage wellbore 52 to mechanically couple tube 60 to the wellbore. In this manner, positioner extensions 240 may operate to enhance the robustness and/or rigidity of the coupling between tube 60 and wellbore 52 and/or between tube 60 and subsurface formation 12, such as to enhance and/or increase a sensitivity of distributed acoustic sensor 120 to acoustic excitations within the subsurface formation.

As a more specific example, and as schematically illustrated in FIG. 1, tube 60 may extend within elongate region 54 defined by wellbore 52, tube positioner 208 may be a tube centralizer, and the one or more positioner extensions 240 may be configured to center the tube within the elongate region during operative use of the cable guide. In other examples, tube positioner 208 may include and/or be a tube de-centralizer that operates to urge and/or position tube 60 away from a central region of elongate region 54. In particular, in some such examples, positioner extension(s) 240 are configured to engage tube 60 and/or wellbore 52 to urge the tube into contact with the wellbore, such as to enhance a mechanical coupling between the tube and the wellbore.

Additionally or alternatively, in some examples, cable guide 200 and/or cable retention structure 220 may be at least partially defined by tube 60. For example, tube 60 itself may include and/or define cable retention structure 220, first retention region 222, second retention region 224, and/or third retention region 226. In such examples, distributed acoustic sensor 120 may be configured such that fiber optic cable 122 is directly coupled to, and/or in direct engagement with, tube 60 during operative use of hydrocarbon conveyance system 100.

Figure 6:
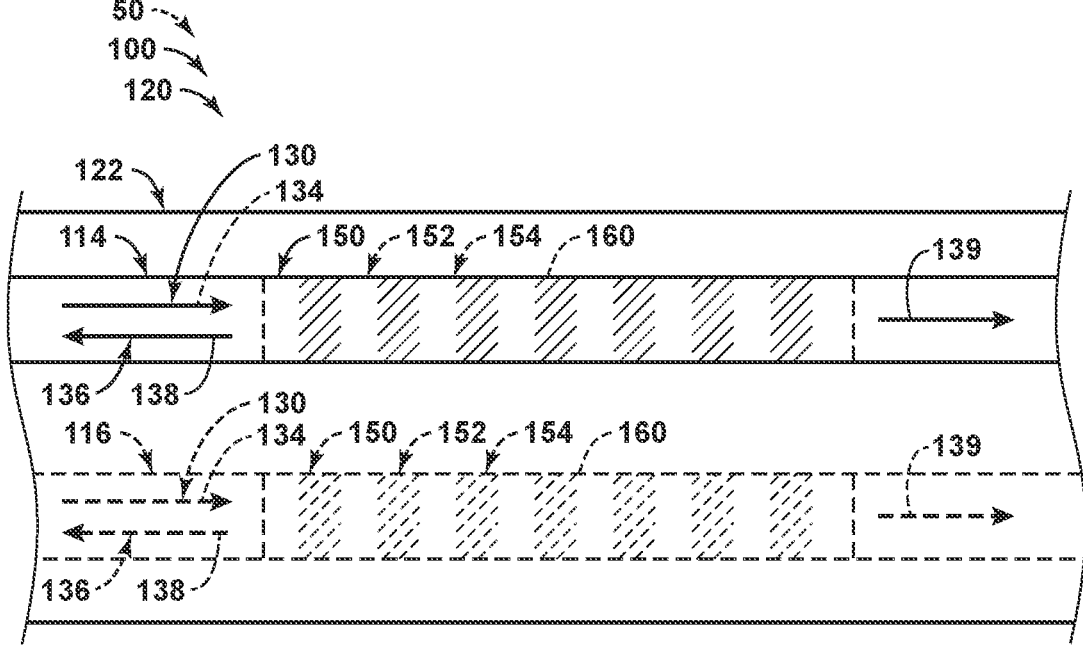
FIG. 6 is a schematic illustration of examples of a distributed acoustic sensor according to the present disclosure.
Figure 7:
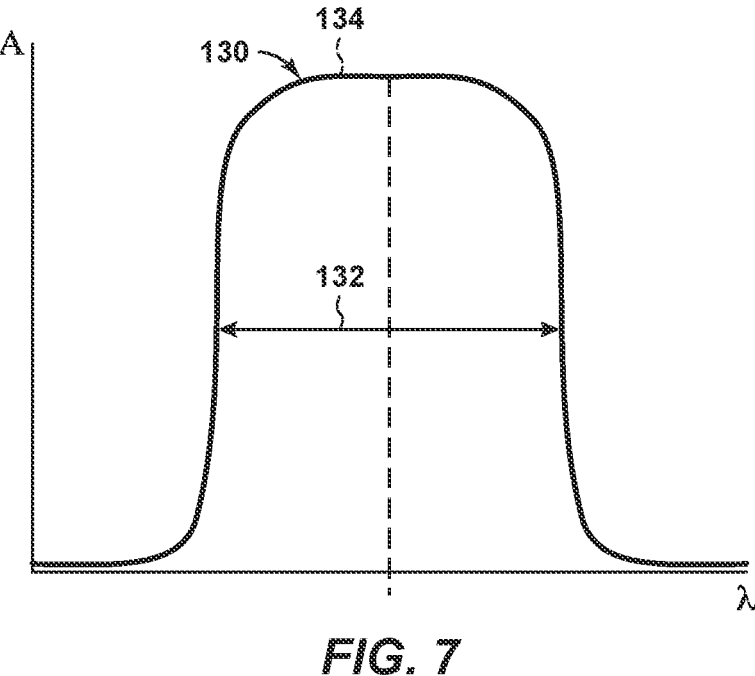
FIG. 7 is a schematic illustration of an example of an initiated optical signal according to the present disclosure.
Figure 8:
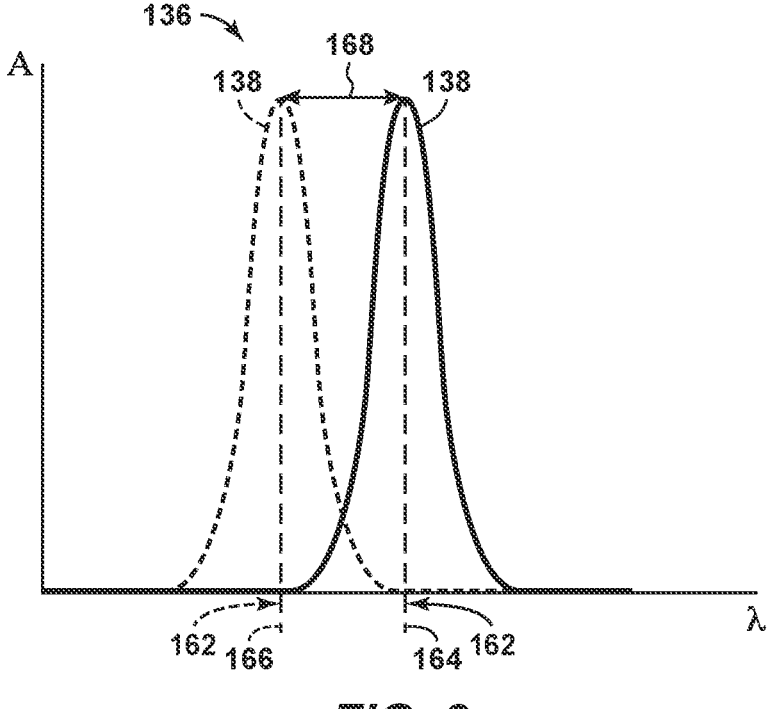
FIG. 8 is a schematic illustration of examples of reflected portions of reflected optical signals according to the present disclosure.

As discussed, distributed acoustic sensor 120 is configured to sense a mechanical strain that is applied to each diffraction grating (e.g., first diffraction grating 150, second diffraction grating 152, and/or third diffraction grating 154) along a direction parallel to the respective sensing axis (e.g., first sensing axis 151, second sensing axis 153, and/or third sensing axis 155), such as by measuring a shift in a property of light that is conveyed by fiber optic cable 122 and that is reflected by each diffraction grating. FIG. 6 schematically illustrates an example of fiber optic cable 122, while FIGS. 7-8 schematically represent features and/or properties of light that may propagate within the fiber optic cable. As schematically illustrated in FIG. 6, fiber optic cable 122 may include an optical fiber 114, which may be in optical communication with sensing region 140 and/or which may include the sensing region. In particular, in some examples, optical fiber 114 defines one or more diffraction gratings 150, such as first diffraction grating 150, second diffraction grating 152, and/or third diffraction grating 154. Additionally or alternatively, in some examples, one or more diffraction gratings (e.g., first diffraction grating 150, second diffraction grating 152, and/or third diffraction grating 154) is optically coupled to and/or spliced onto optical fiber 114. Optical fiber 114 may include and/or be any suitable optical fiber, such as a single-mode optical fiber or a multimode optical fiber.

In some examples, and as discussed, distributed acoustic sensor 120 includes a plurality of spaced-apart sensing regions 140. In particular, in some examples, and as schematically illustrated in FIG. 1, distributed acoustic sensor 120 includes a first sensing region 142 and a second sensing region 144 that is spaced apart from the first sensing region. In some such examples, fiber optic cable 122 may be configured such that optical fiber 114 is in optical communication with each of first sensing region 142 and second sensing region 144. Accordingly, in such examples, each diffraction grating 150 of first sensing region 142 and of second sensing region 144 may be formed in, optically coupled to, and/or in optical communication with a single and/or common optical fiber 114. Alternatively, in some examples, and as schematically illustrated in FIGS. 1 and 6, optical fiber 114 is a first optical fiber 114, and distributed acoustic sensor 120 further includes a second optical fiber 116 that is in optical communication with second sensing region 144 (schematically illustrated in FIG. 1). In some such examples, and as schematically illustrated in FIG. 6, fiber optic cable 122 includes each of first optical fiber 114 and second optical fiber 116. In other examples, and as schematically illustrated in FIG. 1, fiber optic cable 122 is a first fiber optic cable 122, and distributed acoustic sensor 120 further includes a second fiber optic cable 124 that includes second optical fiber 116.

In some examples, each diffraction grating 150 is configured to reflect a portion of a light signal that is incident upon the diffraction grating. In particular, in some examples, and as schematically illustrated in FIG. 6, fiber optic cable 122 and/or optical fiber 114 is configured to convey an initiated optical signal 130 that is conveyed to each diffraction grating and a reflected optical signal 136 that includes one or more reflected portions 138 that are reflected by respective diffraction gratings. More specifically, in such examples, each respective diffraction grating 150 (e.g., each of first diffraction grating 150, second diffraction grating 152, and third diffraction grating 154) is configured to reflect a respective reflected portion 138 of initiated optical signal 130 such that reflected optical signal 136 includes the respective reflected portions reflected by each diffraction grating.

Each diffraction grating 150 (e.g., first diffraction grating 150, second diffraction grating 152, and/or third diffraction grating 154) may include and/or be any suitable structures for producing reflected portions 138 of reflected optical signal 136 as described herein. In particular, in some examples, first diffraction grating 150, second diffraction grating 152, and/or third diffraction grating 154 includes and/or is a fiber Bragg grating 160. In particular, and as schematically illustrated in FIG. 6, fiber Bragg grating 160 may include and/or be a segment and/or region of optical fiber 114 in which a refractive index of the optical fiber exhibits a periodic variation, as schematically represented by the periodic hatching lines in FIG. 6.

FIG. 7 represents an example of a spectral characteristic of initiated optical signal 130, presented as plot of an amplitude A of light in the initiated optical signal as a function of the wavelength λ of the light in the initiated optical signal. Similarly, FIG. 8 represents examples of spectral characteristics of reflected portions 138 of reflected optical signal 136, presented as a plot of an amplitude A of light in the reflected optical signal as a function of the wavelength λ of the light in the reflected optical signal.

As illustrated in FIG. 7, initiated optical signal 130 may be characterized by an optical bandwidth 132 thereof, such as may be equal to a full width at half maximum (FWHM) of the spectral plot shown in FIG. 7. When the initiated optical signal is incident upon each diffraction grating 150, and with reference to FIG. 8, the diffraction grating may be configured to reflect a respective reflected portion 138 that exhibits a spectrum with an amplitude peak at a respective reflected peak wavelength 162. As schematically illustrated in FIG. 6, diffraction grating 150 may be configured to interact with initiated optical signal 130 such that the diffraction grating reflects reflected portion 138 of the initiated optical signal and transmits a transmitted portion 139 of the initiated optical signal. In such examples, transmitted portion 139 may have a spectral content that is similar to and/or equal to that of initiated optical signal 130 aside from the omission of light with wavelengths corresponding to that of the corresponding reflected portion 138. In an example in which distributed sensing region 140 includes a plurality of such diffraction gratings 150 that are optically coupled to a single optical fiber 114, transmitted portion 139 that is transmitted by one such diffraction grating thus may represent the portion of initiated optical signal 130 that is incident upon another such diffraction grating.

In some examples, and as further illustrated in FIG. 7, initiated optical signal 130 includes a plurality of initiated optical signal pulses 134, one of which is illustrated in FIG. 7. In such examples, initiated optical signal 130 may be generated by conveying the plurality of initiated optical signal pulses 134 along fiber optic cable 122 and/or optical fiber 114, such as at a predetermined generation frequency. Accordingly, in such examples, reflected optical signal 136 similarly may include and/or be a series of reflected optical signal pulses that correspond to the plurality of initiated optical signal pulses 134.

Each diffraction grating 150 may be configured such that the value of the respective reflected peak wavelength 162 varies with a mechanical strain that is applied along a length of the diffraction grating (e.g., along a length of fiber optic cable 122 and/or of optical fiber 114 at the diffraction grating, and/or along the respective sensing axis 151). In particular, and with continued reference to FIG. 8, each diffraction grating 150 may be configured such that the respective reflected peak wavelength 162 of the respective reflected portion 138 that is reflected by the diffraction grating is a respective nominal reflected peak wavelength 164 when the diffraction grating is free of the applied mechanical strain. Alternatively, when the mechanical strain is applied to the diffraction grating, the respective reflected peak wavelength 162 may be a respective shifted reflected peak wavelength 166 that differs from the respective nominal reflected peak wavelength 164 by a respective reflected peak wavelength offset 168.

In such examples, the respective reflected peak wavelength offset 168 may correspond to a magnitude of the applied mechanical strain along the respective sensing axis 151 of the diffraction grating. Accordingly, in such examples, measuring, calculating, and/or otherwise determining the respective reflected peak wavelength offset 168 associated with each diffraction grating 150 may enable a determination of a magnitude and/or dynamic frequency content of the mechanical strain that is applied to the diffraction grating. In particular, each diffraction grating 150 may be configured such that the respective nominal reflected peak wavelength 164 is a known quantity, such that the respective peak wavelength offset 168 may be determined by comparing the known respective nominal reflected peak wavelength 164 to the measured respective shifted reflected peak wavelength 166. In some examples, the measurement and/or determination of the respective reflected peak wavelength offset 168 enables a determination of the magnitude of the applied mechanical strain along the respective sensing axis. Thus, by measuring and/or determining the respective reflected peak wavelength offset 168 periodically, and/or as a time-varying quantity (e.g., as time series data), the temporal variation of the magnitude of the applied mechanical strain also may be determined, thereby enabling a determination of the dynamic frequency content of the applied mechanical strain.

In some examples, each of first diffraction grating 150, second diffraction grating 152, and third diffraction grating 154 is configured such that the respective nominal reflected peak wavelengths 164 of each diffraction grating differ from one another. Accordingly, in some such examples, the identity of the diffraction grating that generates each reflected portion 138 of reflected optical signal 136 may be determined and/or inferred by identifying which of the plurality of diffraction gratings has a respective known nominal reflected peak wavelength 164 that is nearest to each measured shifted reflected peak wavelength 166. However, this is not required of all examples of distributed acoustic sensor 120, and it additionally is within the scope of the present disclosure that two or more of first diffraction grating 150, second diffraction grating 152, and third diffraction grating 154 may be configured to exhibit the same respective nominal reflected peak wavelengths 164. In such examples, the identity of the diffraction grating that generated each reflected portion 138 of reflected optical signal 136 may be determined and/or inferred by comparing a delay time between generating initiated optical signal 130 and receiving each reflected portion 138 to a known optical path length corresponding to each respective diffraction grating 150.

Hydrocarbon conveyance system 100 may be configured to generate initiated optical signal 130 and/or to receive and/or analyze reflected optical signal 136 in any of a variety of manners. In some examples, and as schematically illustrated in FIG. 1, hydrocarbon conveyance system 100 includes an optical signal generator 190 configured to generate initiated optical signal 130 and to transmit the initiated optical signal along fiber optic cable 122. As schematically illustrated in FIG. 1, optical signal generator 190 may be configured to transmit initiated optical signal 130 along fiber optic cable 122 at an initiation location 118 of fiber optic cable 122. Additionally or alternatively, in some examples, hydrocarbon conveyance system 100 includes an optical signal receiver 192 configured to receive reflected optical signal 136, such as at initiation location 118 of fiber optic cable 122, and/or an optical signal analyzer 194 configured to analyze the reflected optical signal. For example, optical signal analyzer 194 may be configured to measure and/or determine the respective shifted reflected peak wavelength 166 and/or the respective reflected peak wavelength offset of each reflected portion 138 corresponding to each diffraction grating 150. In some examples, and as schematically illustrated in FIG. 1, controller 180 includes optical signal generator 190, optical signal receiver 192, and/or optical signal analyzer 194.

Controller 180 may include and/or be any suitable structure, device, and/or devices that may be adapted, configured, designed, constructed, and/or programmed to perform the functions discussed herein. As examples, controller 180 may include one or more of an electronic controller, a dedicated controller, a special-purpose controller, a personal computer, a special-purpose computer, a display device, a logic device, a memory device, and/or a memory device having computer-readable storage media.

Additionally or alternatively, controller 180 may include or be at least one, or even be a plurality of separate and/or distinct, computing devices 182. For example, one computing device 182 may be utilized to generate initiated optical signal 130 and/or to receive reflected optical signal 136, and another computing device may be utilized to analyze the reflected optical signal and/or to monitor, identify, and/or characterize the incidence of acoustic excitations upon hydrocarbon conveyance system 100. Stated differently, each computing device 182 may include and/or be one or more of optical signal generator 190, optical signal receiver 192, and/or optical signal analyzer 194.

The computer-readable storage media, when present, also may be referred to herein as non-transitory computer-readable storage media 184. This non-transitory computer-readable storage media may include, define, house, and/or store computer-executable instructions, programs, and/or code, and these computer-executable instructions may direct well hydrocarbon conveyance system 100 and/or controller 180 thereof to perform any suitable portion, or subset, of methods 300, which are discussed in more detail herein. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

In some examples, each diffraction grating 150 is configured to detect a mechanical strain that is applied to the diffraction grating in a manner that applies tension to the diffraction grating, thereby stretching the diffraction grating and producing reflected portion 138 with shifted reflected peak wavelength 166. In some such examples, the diffraction grating may be insensitive to a mechanical strain that is applied to the diffraction grating in a compressive manner. In other examples, however, diffraction grating 150 may be configured to produce reflected portion 138 with shifted reflected peak wavelength 166 responsive to either a tensile strain or a compressive strain, such as by applying a known tension to the diffraction grating during operative use of hydrocarbon conveyance system 100.

In particular, in some examples, and as schematically illustrated in FIG. 1, distributed acoustic sensor 120 includes a tensioning mechanism 174 that is configured to apply a baseline tension to fiber optic cable 122, to optical fiber 114, and/or to diffraction grating 150 within first retention region 222, second retention region 224, and/or third retention region 226. Accordingly, in such examples, the value of reflected peak wavelength 162 produced by each such diffraction grating 150 may be shifted relative to nominal reflected peak wavelength 164 even in the absence of an applied mechanical strain. Thus, in such an example, a measurement of the corresponding shifted reflected peak wavelength 166 may provide a qualitative and/or quantitative characterization of either of a tensile or compressive mechanical strain upon the diffraction grating. In particular, in such an example, a compressive mechanical strain upon the diffraction grating may shift the value of reflected peak wavelength 162 toward nominal reflected peak wavelength 164 in a measurable manner, while a tensile mechanical strain upon the diffraction grating may shift the value of the reflected peak wavelength farther away from the nominal reflected peak wavelength in a measurable manner.

Additionally or alternatively, in some examples, distributed acoustic sensor 120 may be configured to measure an applied pressure that is applied to the distributed acoustic sensor at sensing region 140. In particular, in some examples, and as schematically illustrated in FIG. 1, sensing region 140 includes a differential pressure chamber 172 that is configured to exert a baseline pressure on first diffraction grating 150, on second diffraction grating 152, and/or on third diffraction grating 154. In such an example, the baseline pressure that is applied by differential pressure chamber 172 may operate to shift the value of reflected peak wavelength 162 produced by each such diffraction grating 150 such that a measurement of the corresponding shifted reflected peak wavelength 166 may provide a qualitative and/or quantitative characterization of a magnitude of an external applied pressure that is exerted upon the diffraction grating. In some examples, the baseline pressure may be a pre-set pressure and/or a constant pressure, at least in the absence of an applied and/or varying external pressure. In particular, in some examples, differential pressure chamber 172 includes a strain element, such as a plate and/or a membrane, that is operatively coupled to the respective diffraction grating(s) (e.g., first diffraction grating 150, second diffraction grating 152, and/or third diffraction grating 154) such that a first side of the strain element is exposed to a pressure exerted by wellbore 52 and such that a second side of the strain element is exposed to the baseline pressure. Thus, in such examples, a differential pressure may be applied to the strain element based upon the baseline pressure and the pressure exerted by the wellbore, and variations in the differential pressure (e.g., due to acoustic excitations propagating in the wellbore) may be measured by the respective diffraction grating(s), as described herein.

Figure 9:
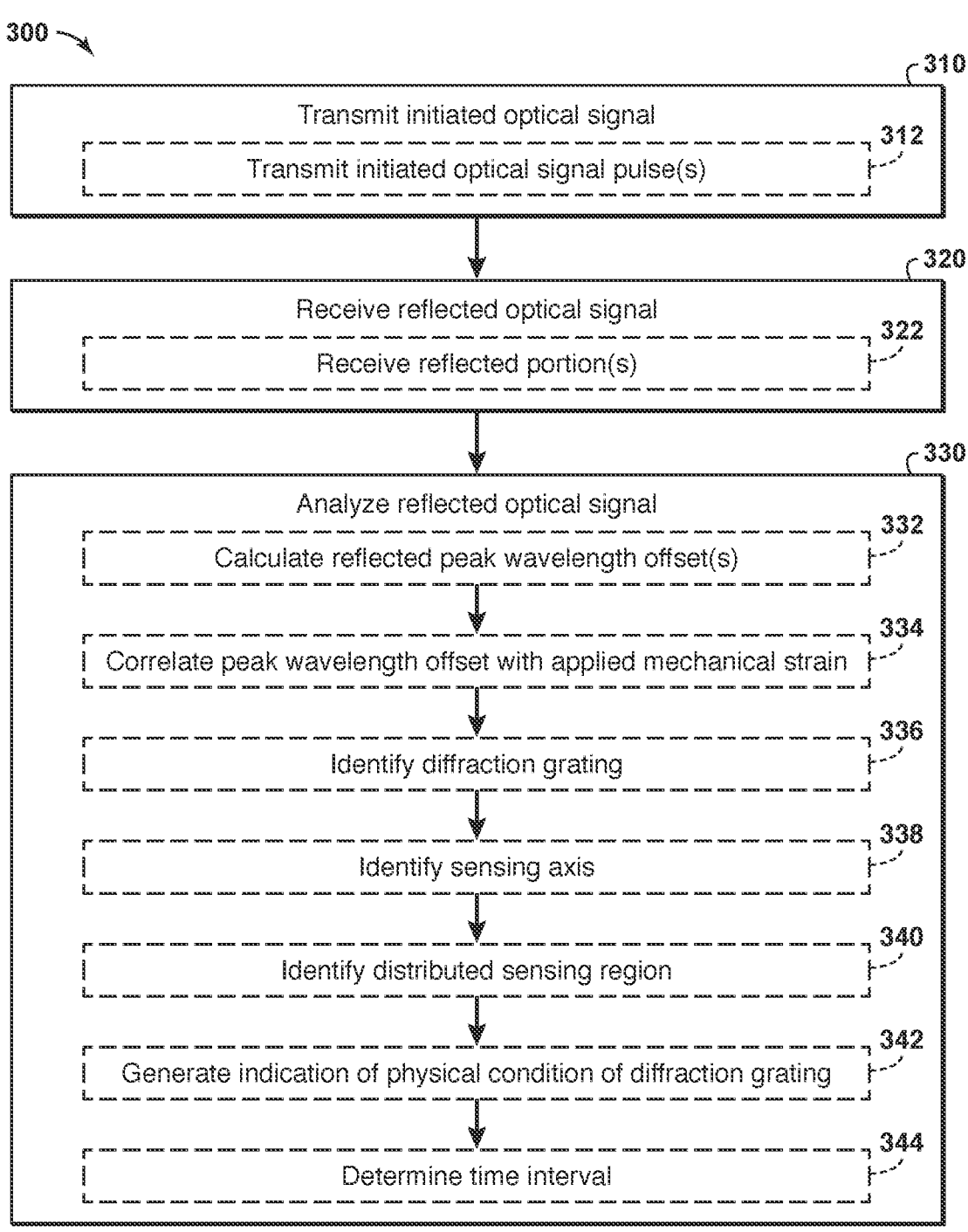
FIG. 9 is a flowchart depicting examples of methods of acoustically probing an elongate region with a hydrocarbon conveyance system according to the present disclosure.

FIG. 9 is a flowchart depicting examples of methods 300 of acoustically probing an elongate region with a hydrocarbon conveyance system, according to the present disclosure. Methods 300 may be performed within and/or utilizing any suitable well or system that extends within a subsurface region, including any of the hydrocarbon wells 50 and/or hydrocarbon conveyance systems 100 that are disclosed herein. In particular, methods 300 are performed with a hydrocarbon conveyance system that includes a tube configured to convey a hydrocarbon and a distributed acoustic sensor that includes a fiber optic cable extending along, and in acoustic communication with, the tube. The fiber optic cable includes a sensing region that includes at least a first diffraction grating aligned with a first sensing axis, and that further may include a second diffraction grating aligned with a second sensing axis, a third diffraction grating aligned with a third sensing axis, etc.

Examples of tubes and/or hydrocarbons that may be utilized in conjunction with methods 300 are disclosed herein with reference to tube 60 and/or conduit fluid 70, respectively. Examples of distributed acoustic sensors, fiber optic cables, and/or sensing regions that may be utilized in conjunction with methods 300 are disclosed herein with reference to distributed acoustic sensor 120, fiber optic cable 122, and/or sensing region 140, respectively. Examples of first diffraction gratings, first sensing axes, second diffraction gratings, second sensing axes, third diffraction gratings, and/or third sensing axes that may be utilized in conjunction with methods 300 are disclosed herein with reference to first diffraction grating 150, first sensing axis 151, second diffraction grating 152, second sensing axis 153, third diffraction grating 154, and/or third sensing axis 155, respectively. In particular, when present, the first sensing axis, the second sensing axis, and/or the third sensing axis are mutually nonparallel to one another.

As shown in FIG. 9, methods 300 include transmitting, at 310 and with an optical signal generator of the hydrocarbon conveyance system, an initiated optical signal along the fiber optic cable. Examples of optical signal generators and/or initiated optical signals that may be utilized in conjunction with methods 300 are disclosed herein with reference to optical signal generator 190 and/or initiated optical signal 130, respectively. In some examples, the transmitting the initiated optical signal at 310 includes transmitting the initiated optical signal at an initiation location of the fiber optic cable, such as initiation location 118 disclosed herein.

As shown in FIG. 9, methods 300 additionally include receiving, at 320 and with an optical signal receiver of the hydrocarbon conveyance system, a reflected optical signal from the fiber optic cable. The reflected optical signal represents an applied mechanical strain that is applied to at least a portion of the fiber optic cable at the sensing region. Examples of optical signal receivers and/or reflected optical signals are disclosed herein with reference to optical signal receiver 192 and/or reflected optical signal 136, respectively. In particular, the reflected optical signal includes respective reflected portions (such as reflected portions 138 disclosed herein) of the initiated optical signal that are reflected by the first diffraction grating, the second diffraction grating, and/or the third diffraction grating. In some examples, the receiving the reflected optical signal at 320 includes receiving the reflected optical signal at the initiation location.

As shown in FIG. 9, methods 300 additionally include analyzing, at 330 and with an optical signal analyzer of the hydrocarbon conveyance system, the reflected optical signal to detect the applied mechanical strain. Examples of optical signal analyzers that may be utilized in conjunction with methods 300 are disclosed herein with reference to optical signal analyzer 194.

The transmitting the initiated optical signal at 310 may be performed in any of a variety of manners. As discussed herein, each respective diffraction grating of the first diffraction grating, the second diffraction grating, and the third diffraction grating (when present) is configured such that a respective reflected peak wavelength of the respective reflected portion is a respective nominal reflected peak wavelength when the respective diffraction grating is free of the applied mechanical strain. In some examples, the transmitting the initiated optical signal at 310 includes transmitting such that the initiated optical signal has an optical bandwidth that encompasses each respective nominal reflected peak wavelength. Examples of reflected peak wavelengths and/or nominal reflected peak wavelengths are disclosed herein with reference to reflected peak wavelength 162 and/or nominal reflected peak wavelength 164, respectively.

In some examples, the initiated optical signal includes a plurality of initiated optical signal pulses, such as initiated optical signal pulses 134 disclosed herein. In such examples, and as shown in FIG. 9, the transmitting the initiated optical signal at 310 may include transmitting, at 312, the plurality of initiated optical signal pulses. In such examples, the transmitting the plurality of initiated optical signal pulses at 312 may include transmitting at any of a variety of frequencies. As examples, the transmitting the plurality of initiated optical signal pulses at 312 may include transmitting the plurality of initiated optical signal pulses at a generation frequency that is at least 1 Hertz (Hz), at least 5 Hz, at least 10 Hz, at least 50 Hz, at least 100 Hz, at least 500 Hz, at least 1 kilohertz (kHz), at least 5 kHz, at least 10 kHz, at least 20 kHz, at least 30 kHz, at least 45 kHz, at most 50 kHz, at most 40 kHz, at most 25 kHz, at most 15 kHz, at most 7 kHz, at most 2 kHz, at most 700 Hz, at most 200 Hz, at most 70 Hz, at most 20 Hz, at most 7 Hz, and/or at most 1 Hz.

The analyzing the reflected optical signal at 330 may be performed in any of a variety of manners. For example, the analyzing the reflected optical signal at 330 may include measuring a respective reflected peak wavelength of the respective reflected portion that is reflected by at least one respective diffraction grating of the first diffraction grating, the second diffraction grating, and/or the third diffraction grating. As a more specific example, and as discussed herein, each respective diffraction grating of the first diffraction grating, the second diffraction grating, and/or the third diffraction grating may be configured such that the respective reflected peak wavelength of the respective reflected portion that is reflected by the respective diffraction grating is the respective nominal reflected peak wavelength when the respective diffraction grating is free of the applied mechanical strain. In such an example, the respective reflected peak wavelength of the respective reflected portion may be a shifted reflected peak wavelength that differs from the respective nominal reflected peak wavelength by a respective reflected peak wavelength offset when the respective diffraction grating experiences the applied mechanical strain. Examples of shifted reflected peak wavelengths and/or reflected peak wavelength offsets that may be utilized in conjunction with methods 300 are disclosed herein with reference to shifted reflected peak wavelength 166 and/or reflected peak wavelength offset 168, respectively.

In some examples, and as discussed, the reflected peak wavelength offset of each reflected portion of the reflected optical signal is at least partially based upon the mechanical strain that is applied to the respective diffraction grating along the respective sensing axis. Thus, a measurement and/or calculation of the respective reflected peak wavelength offset of each reflected portion may provide a quantitative and/or qualitative indication of the mechanical strain that is exerted upon the respective diffraction grating along the respective sensing axis. Accordingly, in some examples, and as shown in FIG. 9, the analyzing the reflected optical signal at 330 includes calculating, at 332, the respective reflected peak wavelength offset corresponding to each such respective diffraction grating. Additionally or alternatively, in some examples, and as shown in FIG. 9, the analyzing the reflected optical signal at 330 includes correlating, at 334, the respective reflected peak wavelength offset with the applied mechanical strain that is applied to the respective diffraction grating along the respective sensing axis. In particular, in some examples, the correlating the respective reflected peak wavelength offset with the applied mechanical strain at 334 includes determining a magnitude and/or dynamic frequency content of the applied mechanical strain.

In some examples, the analyzing the reflected optical signal at 330 includes repeating the calculating the respective reflected peak wavelength offset(s) at 332 and/or the correlating the respective reflected peak wavelength offset with the applied mechanical strain at 334 for respective reflected portions that are reflected by each of a plurality of diffraction gratings (e.g., by the first diffraction grating, by the second diffraction grating, and/or by the third diffraction grating). Accordingly, in such examples, the analyzing the reflected optical signal at 330 may include determining the net magnitude of the applied mechanical strain and/or the direction along which an acoustic excitation that produces the mechanical strain propagates relative to the sensing region. Moreover, by comparing the net magnitude and/or the directionality of the acoustic excitation as measured and/or determined at each of a plurality of spaced-apart sensing regions, the distributed acoustic sensor thus may enable quantitative and/or qualitative characterization of an acoustic excitation as the excitation propagates through a subsurface region, such as subsurface region 10 described herein, and/or across the tube.

In some examples, the analyzing the reflected optical signal at 330 includes one or more steps for identifying an origin of one or more respective reflected portions of the reflected optical signal. For example, and as shown in FIG. 9, the analyzing the reflected optical signal at 330 may include identifying, at 336, the respective diffraction grating of the sensing region that produced the respective reflected portion, such as by comparing the respective shifted reflected peak wavelength of the respective reflected portion to a known nominal reflected peak wavelength of each diffraction grating. Additionally or alternatively, and as shown in FIG. 9, the analyzing the reflected optical signal at 330 may include identifying, at 338, the respective sensing axis (e.g., the first sensing axis, the second sensing axis, or the third sensing axis) corresponding to the respective diffraction grating that produced the respective reflected portion. Additionally or alternatively, and as shown in FIG. 9, the analyzing the reflected optical signal at 330 may include identifying, at 340, a respective sensing region of the plurality of sensing regions that produced the respective reflected portion.

In some examples, and as shown in FIG. 9, the analyzing the reflected optical signal at 330 includes generating, at 342, an indication of a physical condition of at least one diffraction grating, such as the respective diffraction grating corresponding to the calculating the respective reflected peak wavelength offset(s) at 332. In particular, in some examples, the generating the indication at 342 is at least partially based on the calculating the respective reflected peak wavelength offset(s) at 332. As a more specific example, the generating the indication at 342 may include generating an indication of a location of the respective diffraction grating that is experiencing the applied mechanical strain and/or an indication of a position along a length of the tube corresponding to the sensing region that includes the respective diffraction grating, as described herein. Additionally or alternatively, the generating the indication at 342 may include generating an indication of a respective sensing axis (e.g., the first sensing axis, the second sensing axis, or the third sensing axis) corresponding to the respective diffraction grating, as described herein. Additionally or alternatively, the generating the indication at 342 may include generating an indication of a magnitude of the applied mechanical strain and/or of a direction along which an acoustic excitation that generated the applied mechanical strain propagates, as described herein. Additionally or alternatively, the generating the indication at 342 may include generating an indication of a temperature of the respective diffraction grating and/or of a magnitude of an applied pressure that is applied to the respective diffraction grating, as described herein.

In various examples, the transmitting the initiated optical signal at 310 may include transmitting utilizing time-division multiplexing and/or wavelength-division multiplexing. For example, the transmitting the initiated optical signal at 310 may include determining, at 344, a time interval separating the transmitting the initiated optical signal at 310 and the receiving the reflected optical signal at 320. As a more specific example, and as shown in FIG. 9, the receiving the reflected optical signal at 320 may include receiving, at 322, the respective reflected portion that is reflected by at least one respective diffraction grating (e.g., the first diffraction grating, the second diffraction grating, or the third diffraction grating). In such an example, the determining the time interval at 344 may include measuring a time interval separating the transmitting the initiated optical signal at 310 and the receiving the respective reflected portion(s) at 322. In this manner, and as more specific examples, the analyzing the reflected optical signal at 330 may include performing the identifying the respective diffraction grating at 336 and/or the identifying the respective sensing axis at 338 at least partially based upon the determining the time interval at 344. Additionally or alternatively, in this manner, the analyzing the reflected optical signal at 330 may include performing the identifying the respective sensing region at 340 at least partially based upon the determining the time interval at 344. In some examples, such as in an example in which the transmitting the initiated optical signal at 310 includes transmitting utilizing time-division multiplexing and/or wavelength-division multiplexing, the receiving the reflected optical signal at 320 and/or the analyzing the reflected optical signal at 330 similarly include analyzing utilizing time-division multiplexing and/or wavelength-division multiplexing. For example, in an example in which the transmitting the initiated optical signal at 310 includes transmitting utilizing multiplexing (e.g., time-division and/or wavelength-division multiplexing), the receiving the reflected optical signal at 320 and/or the analyzing the reflected signal at 330 may include performing a de-multiplexing operation.

Additionally or alternatively, in some examples, the transmitting the initiated optical signal at 310 includes transmitting such that two or more initiated optical signal pulses have respective optical bandwidths (such as optical bandwidths 132 disclosed herein) that are at least partially non-overlapping. For example, the sensing region may be configured such that the first diffraction grating has a nominal reflected peak wavelength that is different than that of the second diffraction grating. In such an example, the plurality of initiated optical signal pulses may include a first initiated optical signal pulse with a respective optical bandwidth that encompasses the respective nominal reflected peak wavelength of the first diffraction grating but not of the second diffraction grating. In such an example, the plurality of initiated optical signal pulses additionally may include a second initiated optical signal pulse with a respective optical bandwidth that encompasses the respective nominal reflected peak wavelength of the second diffraction grating but not of the first diffraction grating. Accordingly, in such an example, the identity of the diffraction grating that produces a particular reflected portion of the reflected optical signal may be determined by identifying whether the particular reflected portion corresponds to the first initiated optical signal pulse or the second initiated optical signal pulse, such as by correlating the time at which the reflected portion is recorded with the time at which the initiated optical signal pulse was transmitted.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A cable guide configured to support a fiber optic cable relative to a tube, wherein the fiber optic cable includes a sensing region that includes a first diffraction grating, a second diffraction grating, and a third diffraction grating, wherein the second diffraction grating and the third diffraction grating are at most five meters from the first diffraction grating, the cable guide comprising a cable retention structure configured to support the fiber optic cable;

wherein the cable retention structure includes a first retention region, which is configured to align the first diffraction grating along a first sensing axis, a second retention region, which is configured to align the second diffraction grating along a second sensing axis, and a third retention region, which is configured to align the third diffraction grating along a third sensing axis; and wherein the first sensing axis, the second sensing axis, and the third sensing axis, are nonparallel to one another.

2. The cable guide of claim 1, wherein one or both of the cable guide and the cable retention structure includes one or more sensing region visual indicators that provides a visual indication of a location of a respective one or both of the first retention region and the second retention region.

3. The cable guide of claim 1, wherein the cable guide includes a tube clamp; wherein the tube clamp includes a clamping structure configured to selectively grip the tube to retain the cable guide at a fixed clamp location relative to the tube.

4. The cable guide of claim 1, wherein the cable guide includes a tube mandrel; wherein the tube extends within an elongate region that is defined by a wellbore extending within a subsurface region; and wherein the tube mandrel is configured to engage each of the tube and the wellbore to mechanically couple the tube to the wellbore during operative use of the cable guide.

5. The cable guide of claim 1, wherein the cable guide includes a tube positioner; wherein the tube extends within the elongate region that is defined by the wellbore extending within the subsurface region; and wherein the tube positioner includes one or more positioner extensions extending radially away from the tube and configured to position the tube within the elongate region during operative use of the cable guide.

6. A hydrocarbon conveyance system, comprising:

a tube that defines a tubular conduit configured to convey a hydrocarbon;

a distributed acoustic sensor that includes a fiber optic cable extending along, and in acoustic communication with, the tube; wherein the fiber optic cable includes a sensing region that includes a first diffraction grating aligned with a first sensing axis, a second diffraction grating aligned with a second sensing axis, and a third diffraction grating aligned with a third sensing axis, wherein the second diffraction grating and the third diffraction grating are at most five meters from the first diffraction grating; and a cable guide that operatively couples the fiber optic cable to the tube such that the first sensing axis, the second sensing axis, and the third sensing axis, are nonparallel to one another;

wherein the cable guide is the cable guide of claim 1.

7. The hydrocarbon conveyance system of claim 6, wherein the fiber optic cable is configured to convey an initiated optical signal and a reflected optical signal; wherein each respective diffraction grating of the first diffraction grating and the second diffraction grating is configured to reflect a respective reflected portion of the initiated optical signal with a respective reflected peak wavelength that varies with an applied mechanical strain applied to the respective diffraction grating; and wherein the reflected optical signal includes the respective reflected portion reflected by each of the first diffraction grating and the second diffraction grating.

8. The hydrocarbon conveyance system of claim 6, wherein one or both of the first diffraction grating and the second diffraction grating is a fiber Bragg grating.

9. The hydrocarbon conveyance system of claim 6, wherein each respective diffraction grating of the first diffraction grating and the second diffraction grating is configured such that the respective reflected peak wavelength of the respective reflected portion is a respective nominal reflected peak wavelength when the respective diffraction grating is free of the applied mechanical strain applied to the respective diffraction grating and such that the respective reflected peak wavelength of the respective reflected portion is a shifted reflected peak wavelength that differs from the respective nominal reflected peak wavelength by a respective reflected peak wavelength offset when the respective diffraction grating experiences the applied mechanical strain; and wherein the respective reflected peak wavelength offset corresponds to a magnitude of the applied mechanical strain.

10. The hydrocarbon conveyance system of claim 6, wherein the fiber optic cable includes the sensing region visual indicator that provides the visual indication of one or both of the location and an orientation of one or more of the sensing region, the first diffraction grating, the first sensing axis, the second diffraction grating, and the second sensing axis.

11. The hydrocarbon conveyance system of claim 6, wherein the sensing region is one of a plurality of sensing regions spaced apart along a length of the tube.

12. The hydrocarbon conveyance system of claim 11, wherein each pair of adjacent sensing regions of the plurality of sensing regions are spaced apart along the length of the tube by a separation distance that is at least 0.1 meter (m) and at most 500 m.

13. The hydrocarbon conveyance system of claim 11, wherein the cable guide is a first cable guide of a plurality of cable guides spaced apart along the length of the tube; and wherein each sensing region of the plurality of sensing regions is supported by a respective cable guide of the plurality of cable guides.

14. The hydrocarbon conveyance system of claim 11, wherein the fiber optic cable optically interconnects each of the plurality of sensing regions.

15. A hydrocarbon well, comprising:

a wellbore extending within a subsurface region; and the hydrocarbon conveyance system of claim 6, wherein the wellbore defines the elongate region that is defined by the wellbore extending within the subsurface region.

16. The cable guide of claim 1, wherein the second diffraction grating and the third diffraction grating are less than two meters from the first diffraction grating.

* * * * *